C. HOFF.
PRITCH.
APPLICATION FILED MAR. 15, 1909.
940,597. Patented Nov. 16, 1909.
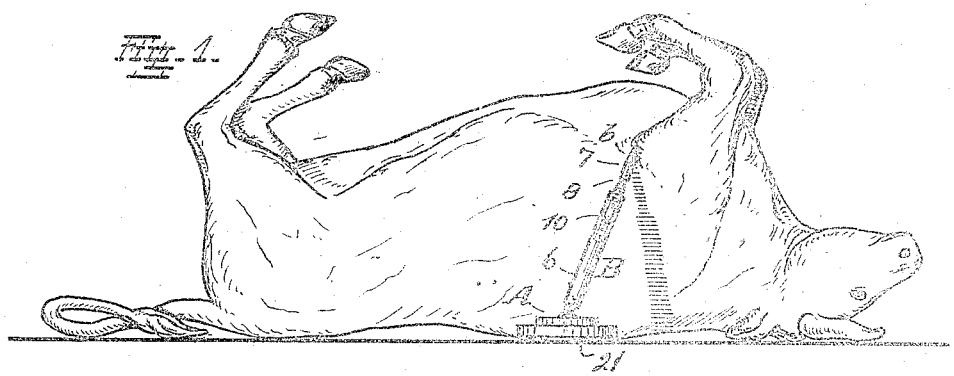
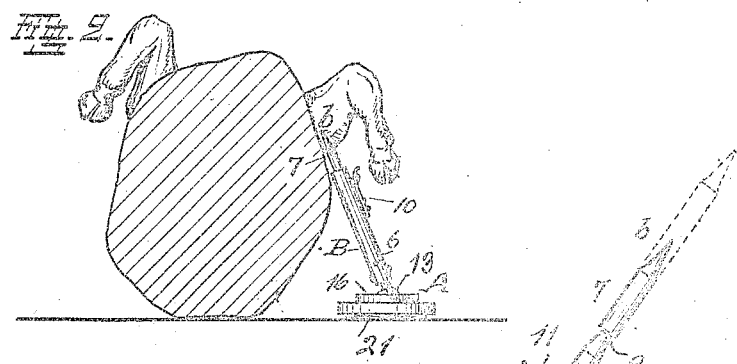
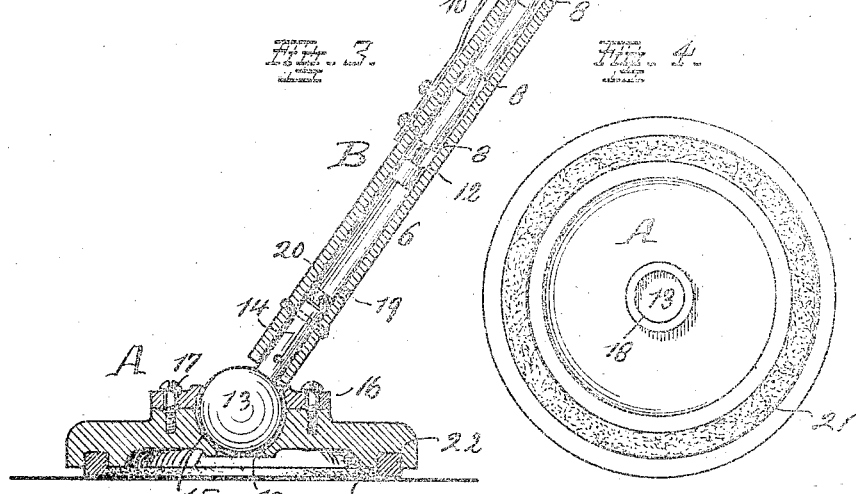
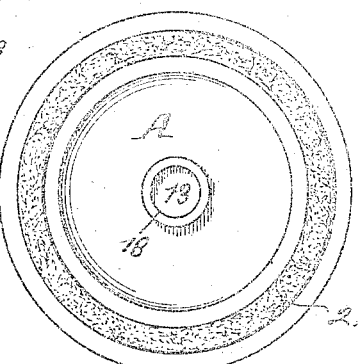
Witnesses
Thos. L. Moore
T. LeBeau
Inventor
Charles Hoff
by C. Shenzel atty

UNITED STATES PATENT OFFICE.

CHARLES HOFF, OF CINCINNATI, OHIO, ASSIGNOR OF ONE-HALF TO BERNARD SICKING, OF CINCINNATI, OHIO.

PRITCH.

940,597.  Specification of Letters Patent.  Patented Nov. 16, 1909.

Application filed March 15, 1909. Serial No. 483,444.

*To all whom it may concern:*

Be it known that I, CHARLES HOFF, a citizen of the United States, and a resident of Cincinnati, Hamilton county, State of Ohio, have invented a certain new and useful Pritch; and I do declare the following to be a clear, full, and exact description thereof, attention being called to the accompanying drawing, with the reference characters marked thereon, which forms also a part of this specification.

This invention relates to improvements in an implement used in beef killing establishments and known as a pritch.

A beef after killed and bled is usually placed upon the killing floor in a position with its abdomen uppermost to facilitate certain operations to be performed upon the carcass, such as cutting of the legs, stripping part of the skin etc. A pritch is used to hold the carcass in such a position and against a tendency to roll upon its side.

In the following specification and particularly pointed out in the claims at the end thereof, will be found a full description of my invention, together with its manner of use, parts and construction, which latter is also illustrated in the accompanying drawing, in which:—

Figures 1 and 2, illustrate manner of applying and using the implement. Fig. 3, is an enlarged sectional elevation of it, and Fig. 4, shows an underside view of Fig. 3, it being substantially an underside view of the base of the implement.

As to its function, the implement constitutes substantially a prop adapted, while supported upon the floor, to engage a carcass at its side, so as to hold the same in the desired position as shown in Figs. 1 and 2. The construction involves a base A of sufficient weight so as not to slip readily and the prop proper, indicated at B and connected to the former. This connection is so as to permit the prop to assume an inclined position with reference to the floor, a position, the obvious necessity of which becomes apparent from inspection of Fig. 2. The implement is so placed that point $b$ of the prop engages the carcass in a suitable place, preferably in the pit under one of the fore-legs where any damage to meat or skin is of no consequence.

In determining positions, the implement is placed some distance away from the carcass so that for effecting engagement, the latter leans somewhat toward the implement as shown in Fig. 2, and by resting upon the point, it readily maintains its engagement against any tendency to cant over in the opposite direction. The proper position within certain limits may be readily found by shifting base A back and forth with reference to the carcass as may be necessary. Adjustment for greater variations due to differences in size of carcasses is obtained by providing a construction which permits adjustment of the length of the prop. For such purpose this latter consists of two parts, adjustably connected to each other and one of them connected to the base. I use a sheath 6, which is connected to the base and a pin 7 slidably fitted to this sheath. If the prop is too short, this pin is pulled out as indicated in Fig. 3, until the proper length is attained. Suitable means are provided to hold it in its adjusted position as for instance a number of shoulders 8 in pin 7 adapted to be engaged by a catch 9 actuated by a spring 10. The spring is attached to the sheath and carries the catch which latter plays in and out through an opening 11 in the side of the sheath. Shoulders 8 are obtained by notching the pin, or by reducing its diameter to a depth sufficient to produce the shoulders. The bottom of the resulting notches is inclined and meets the outside of the pin below the notch without an offset, so that no manipulation of the spring becomes necessary when the pin is moved in one direction, that is outwardly. The last notch at the lower end of the pin is so formed as to produce two shoulders, the additional shoulder 12 preventing the pin from being pulled out of the sheath entirely. The facility to meet positions is increased by connecting the prop to its base by means of a joint which permits it to assume inclined positions in various directions and at variable angles.

The connection is a permanent one and by a joint, which permits the prop to incline at the same time in two planes with reference to the carcass and without requiring shifting of the base to obtain a change in position of the prop. A ball and socket-joint is used, the ball 13 being connected to the lower end of the prop and seated in a socket in the base. It is provided with a shank 14 fitted into the lower end of the sheath where it is held by suitable means like screws or rivets. The ball is seated in a cup-shaped recess 15 in the upper side of the base in which position it is held by a collar 16, fitted around a part of the ball above the recess. The collar is held to the base by screws 17 and serves also to hold the prop to a normally lowest inclined position beyond which it cannot drop. Observe Fig. 3. An opening 18 is provided below the ball in the underside of the socket so formed, to prevent lodgment and accumulation therein of any matter which might form an obstacle to the free movement of the jointed parts. An opening 19 is also provided in sheath 6 at the lower end thereof, so that any matter, or water may work out and drain off. By pulling catch 9 away from pin 7, and by holding it so until the pin has dropped down into sheath 6, the prop is caused to assume its shortest length. A cushion 20 is interposed upon which it drops at this time. The point at which end $b$ of the prop engages the carcass may however be lowered still more by moving base A away from the carcass, more or less so that the prop assumes a position more inclined. Likewise by moving base A closer to the carcass, the point of engagement may be raised irrespective of the adjustment by lengthening the prop. For this latter purpose, that is to lengthen the prop, pin 7 is simply raised in sheath 6 until catch 9 snaps under one of the shoulders 8. No manipulation of the catch is required for this adjustment. Shoulder 12 before referred to limits movement of the pin in this direction and prevents its entire withdrawal as soon as it comes in contact with catch 9. Lifting of this latter however at this time, frees the pin entirely and permits its removal from the sheath if necessary for any purpose.

The underside of the base is entirely smooth to prevent injury to the killing floors which now are usually of asphalt, cement, or iron to comply with sanitary requirements recently prescribed by law. Weight and frictional resistance are therefore relied upon to maintain the device in position, for which purpose a sole 21 of suitable material like rubber, leather, soft wood etc. is secured against the underside of the base. This sole may be in form of a ring which is seated in a groove 22. The fact that the prop is permanently connected to its base and that it extends always upwardly from the same adds greatly to the convenience with which this implement may be used. For instance in carrying it from one place to another, it may be grasped at the prop and it is not necessary to stoop to lift also the base.

When the device is not needed for any length of time, it is desirable to pull pin 7 entirely out of sheath 6, and to re-insert it inverted, that is with point $b$ inwardly, to protect the latter and also to prevent injury from it. This latter object might also be attained by placing a removable cap upon point $b$.

Having described my invention, I claim as new:

1. A pritch consisting of a base, a sheath connected thereto, a pin slidably fitted to this sheath and spring-actuated means operating to hold the pin adjustably in certain positions within the sheath.

2. In a pritch the combination of a base provided with a socket, a ball fitted to this socket, a tubular sheath, a shank whereby ball and sheath are connected to each other, a pin adjustably fitted to this sheath and means to hold the pin in its adjusted position.

3. In a pritch, the combination of a base, a sheath adjustably connected thereto at its lower end and provided with a lateral opening near its upper end, a spring-actuated catch carried by the sheath and so connected that its free end projects through the opening mentioned and into the sheath, and a pointed pin slidably fitted into this sheath and provided with shoulders whereby, when in engagement with the catch, said pin is supported in a certain position within the sheath.

4. A pritch consisting of a base portion and a prop pointed at its free end and permanently connected to said base to extend in a direction inclined to the plane of said base.

5. A pritch for the purpose described which consists of a prop the free end of which is adapted to engage a carcass, a base to the upper side of which this prop is connected and means for adjusting it to various angles with reference to the base and in various vertical planes on this base to meet the position of a carcass.

6. A pritch consisting of a base having on its underside a floor-engaging surface of soft material, and provided on its upperside with an adjustably connected prop which has a pointed end.

7. A pritch consisting of a base, a sheath connected thereto, a pin slidingly fitted to this sheath, one of the two parts mentioned being provided with recesses and a groove, and a spring-catch on the other part which, when occupying one of the recesses mentioned, prevents movement of the pin within the sheath in one direction, while when occupying the groove, it prevents such movement in both directions.

8. A pritch consisting of a base and of a prop loosely jointed thereto in a manner to be capable to assume inclined positions at various angles its free end being pointed and means to sustain this prop in a normally lowest position beyond which it cannot drop.

In testimony whereof, I hereunto affix my signature in the presence of two witnesses.

CHARLES HOFF.

Witnesses:
C. SPENGEL,
T. LE BEAU.